Jan. 28, 1936.    P. S. WILLIAMS ET AL    2,028,887
APPARATUS FOR MEASURING TEMPERATURES
Original Filed Aug. 17, 1932
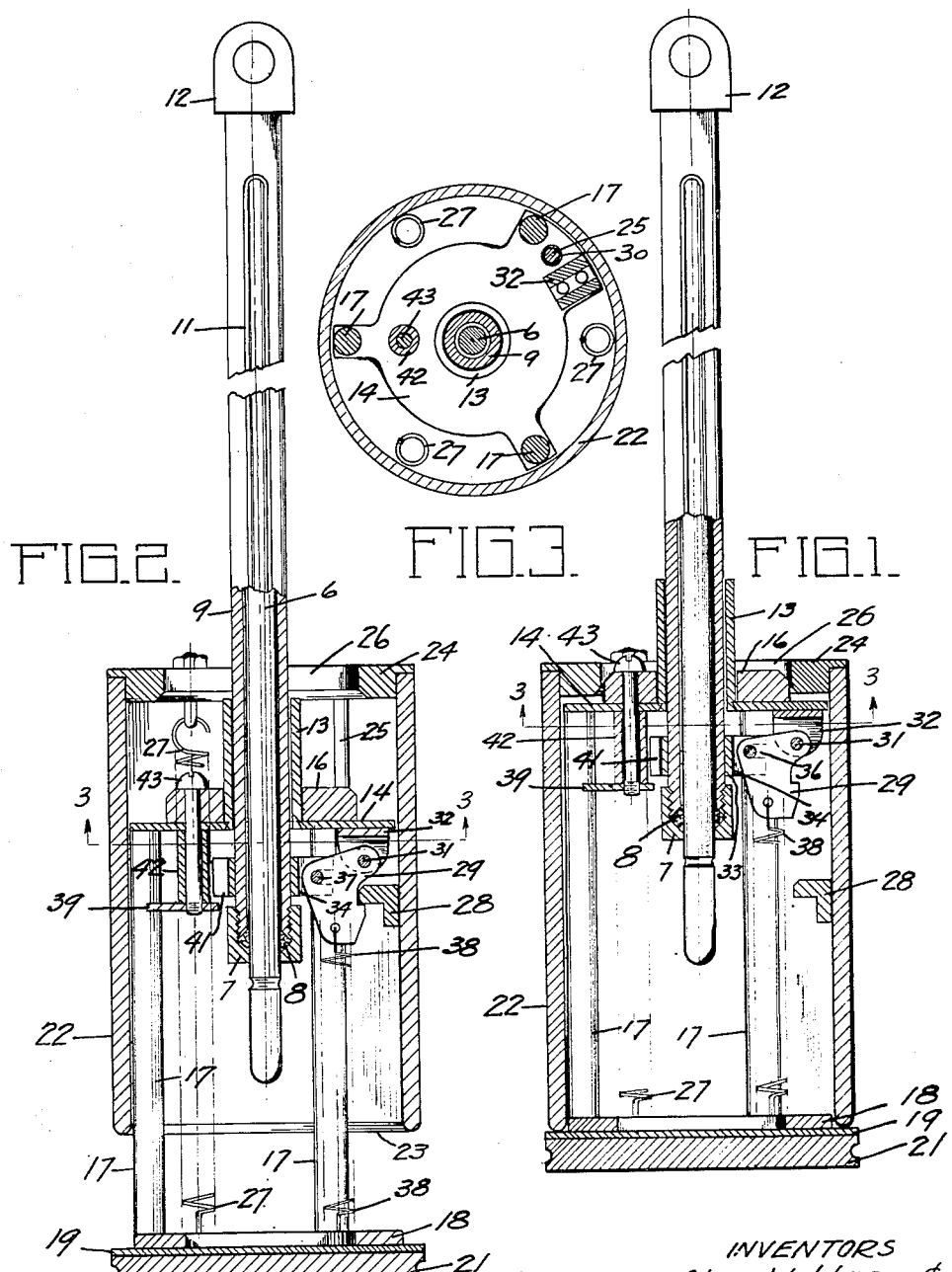
INVENTORS
Oliver W. Johnson &
Philip S. Williams
By Robert N. Eckhoff
Attorney.

UNITED STATES PATENT OFFICE 2,028,887

APPARATUS FOR MEASURING TEMPERATURES

Philip S. Williams and Oliver W. Johnson, Palo Alto, Calif.

Application August 17, 1932, Serial No. 629,172
Renewed July 8, 1935

10 Claims. (Cl. 73—52)

This invention relates to obtaining an accurate temperature of the contents of a vessel as a tank, reservoir or tank car and to an apparatus therefor.

Present thermometers and temperature thiefs do not enable tank temperatures to be obtained which are correct. In tanks equipped with thermocouples, so that the temperature at a given point in the tank was known with accuracy, the thermometers or thieving devices would not check the thermocouple reading at a given level in the tank. In addition, it was found necessary, to let some types of thermometers and thiefs remain suspended at that level in the tank at which the temperature was desired until they had reached equilibrium and were the same temperature as the oil. The delay thus occasioned was as long as two and a half hours and the results secured were inaccurate for even though temperature equilibrium was attained at some level in the tank, the thief was subject to the temperature of the oil through which it passed when raised for reading of the thermometer.

In the following table some test results are tabulated. These results were secured in examination of various oils in tanks with the following thermometers:

Small cup—12" wood back thermometer, graduated in 1° intervals up to 220° F.—bulb in small cup.

Large cup—same thermometer but with 200 c. c. cup (A. P. I. tentative standard).

A wooden thief equipped with a thermometer.

The thermometers were left in position in the tank, being examined at increasing time intervals until the thermometer reading became constant for successive readings.

The above results indicate the delay in a thermometer coming to equilibrium and the inaccuracies in the results obtained. These results were secured under conditions most favorable to the equipment tested for the atmospheric temperature was nearly constant and was close to the temperature of the oils during the test.

In light oils, the thermometer is affected by the hotter surface oil layer through which it is withdrawn while in cold heavy oils, as temperatures are now secured, the readings are almost invariably low since equilibrium is not attained. In hot heavy oils, a hot surface layer affects the thermometer and results from 12° to 20° too low to 9° too high when the oil was only actually 103° F., as determined by means of a thermocouple, were secured.

The present invention enables accurate reproduceable temperature readings to be taken readily which check against those indicated by a thermocouple, whether in light oils, gasolines or hot or cold heavy oils.

In accordance with the present invention the temperature in a vessel containing an oil or other fluid can be accurately secured without undue delay at any desired level in the tank. The importance of this will be appreciated by those who deal in oils and the like and who find it necessary to correct the volume or weight to some specified temperature, usually 60° F., from the actual temperature. Thus, fuel oils and road oils are loaded hot into tank cars or trucks; the temperature of a loaded tank car or tank truck can now be quickly and accurately taken at any specified point which may represent an average temperature, or at a

| Type of oil | Depth feet where reading taken | Time to reach equilibrium minutes | | Temperature difference between oil surface and depth where reading taken °F. | Error in reading °F. | | |
|---|---|---|---|---|---|---|---|
| | | Small cup | Large cup | | Small cup | Large cup | Wooden thief |
| Gasoline | 1 | 15 | 13 | 4.1 | 0.2 | 0.1 | |
| | 18½ | 3 | 5 | ¹1.7 | 1.1 | 1.0 | |
| 34° distillate | 1 | 24 | 21 | 0 | 0.1 | 0.1 | |
| | 16 | 10 | 12 | 1.2 | 0.8 | 0.1 | |
| | 32 | 11 | 15 | 3.6 | 2.5 | 1.5 | |
| 29.4° crude | 1 | -------- | -------- | 4.6 | -------- | -------- | 0.2 |
| | 13 | -------- | -------- | 5.3 | -------- | -------- | 0.1 |
| | 24 | -------- | -------- | 6.4 | -------- | -------- | 0.2 |
| 23° crude | 1 | 70 | 90 | 0 | 0 | 0 | |
| | 15 | 65 | 45 | 7.2 | 0.8 | 0.6 | |
| | 30 | 55 | 75 | 25.6 | 0.9 | 0.6 | |
| 14.3° hot fuel | 1 | 60 | 60 | 0 | 0.3 | 0.3 | 8.9 |
| | 13 | 70 | 80 | 12.8 | 0 | 0 | |
| | 21 | -------- | -------- | 0 | -------- | -------- | 6.4 |
| 15.3° cold fuel | 1 | 90 | 105 | 2.0 | 0.9 | 1.0 | |
| | 21 | 130 | 150 | 9.2 | 1.3 | 1.3 | |

¹ Difference in temperature between point and 1 ft. level.

series of points, an integration of which may represent the true average temperature.

It is in general the object of the present invention to improve upon present apparatus for securing the temperature of the contents of a vessel.

A further object of the invention is to provide an apparatus for taking of temperatures in a tank.

The invention is especially valuable for obtaining precise temperature readings of a liquid at any specified point in a minimum of time and without elaborate and expensive installations or equipment.

The invention possesses other advantageous features and objects some of which with the foregoing will appear at length in the following wherein we have disclosed the preferred method and apparatus of our invention.

In the drawing accompanying and forming a part hereof, Figure 1 is a side elevation partly in section of our apparatus in closed position as when it is to be drawn up to the tank top to read the thermometer indicating the temperature of the sample trapped in the apparatus.

Figure 2 is a view similar to Figure 1, the apparatus being open as when it is lowered into the tank and then raised and lowered through a short distance to obtain the equilibrium temperature at a certain depth.

Figure 3 is a section on line 3—3 of Figure 1.

We have found that if a thermometer is brought to equilibrium with the oil at the desired level and, thereafter, removed with its bulb and a portion of the stem sealed in contact with a quantity of oil from that level, the thermometer reading will accurately represent the equilibrium temperature at the desired level. Thus, the two essential operations are:

1. To bring the thermometer bulb and its immediate surroundings into temperature equilibrium with the fluid to be tested for temperature.

2. To segregate a sample truly representative of the fluid sample to be taken which will maintain the equilibrium temperature attained under operation 1, against external temperature changes, variations in the temperature of the environment or other conditions which tend to change the temperature of the sample, i. e. evaporation which will cool the sample, actual change in the fluid about the thermometer, etc.

This method obviates the inaccuracies and delays in obtaining temperatures in tanks and the like where prior art devices are used. Thus, with the use of one present device, while a thermometer (with or without a cup device or other prior art means for keeping a sample of oil about the thermometer bulb) may be allowed to remain at a given location for a sufficient length of time to attain temperature equilibrium, it is necessary, because of the nature of the thermometer, to remove the thermometer to a location where the thermometer can be read. The change in location is accompanied by a change in temperature environment and it follows that the temperature indicated by the thermometer is changed by the same mechanism which originally brought it into equilibrium with the oil tested so that a temperature is indicated when the thermometer is read which is false.

With another known device, for instance that shown in the Gersdoff Patent 1,393,279 and the Friedman Patent 1,816,726, a thermometer is suspended in a space in the device to be filled with oil, a sample of oil from the precise point where the temperature of the oil is desired being admitted into the space in the device. Upon admission of the oil, an interchange of heat occurs between the thermometer, the equipment adjacent the thermometer (the device) and the sample. Hence, while the equilibrium temperature attained by the thermometer may be adequately protected, this equilibrium temperature is different from the oil sample which originally entered the thief since that oil has exchanged heat with the device and the thermometer. The oil in the space is also subject to displacement upon removal.

The method of our invention procures a true equilibrium temperature and this method has been successfully practiced with the following apparatus.

In this apparatus, a thermometer 6, of a desired temperature range and accuracy, is secured by nut 7 and packing 8 in a brass tube 9. Tube 9 is cut away as at 11 so that the thermometer can be read while a connection 12 is secured on the end of tube 9 for a cord for handling the apparatus.

A brass sleeve 13 is slidably mounted on tube 9 and carries a brass disc 14 upon which is mounted bakelite collar 16. Several brass rods 17 are fastened to disc 14 and another brass disc 18, thus forming a cage through which oil or other fluid can circulate. A cork gasket 19 and a bakelite disc 21 are secured to disc 18.

A bakelite shell 22 is extended about the cage and surface 23 seats on the cork gasket when the device is closed (Fig. 1). A bakelite collar 24 is secured on shell 22 and includes an opening 26 which the collar 16 substantially closes so that fluid cannot enter or leave when the device is closed (Fig. 1). However, when the device is open (Fig. 2) fluid can circulate through the cage and through opening 26. Pin 25, screwed through collar 24, extends through aperture 30 in disc 14 to retain the cage non-rotatably in the shell 22 during movement of the cage in the shell.

To enable the device to be closed at will, we provide several springs 27 which are secured to collar 24 and disc 18. These springs bias gasket 19 toward surface 23 so that the device tends to close as in Figure 1. A latch mechanism 28 and a trigger 29 enable the device to be closed at will. Trigger 29 is hinged by pin 31 in bracket 32 carried by disc 14. A collar 33 is secured on tube 9 and has a yoke 34 extending therefrom, the arms of the yoke being notched as at 36 to receive pin 37 in trigger 29. A spring 38 is secured to trigger 29 from disc 18.

A stop 39 limits downward movement of tube 9 relative to sleeve 13, collar 33 having a projection 41 thereon which engages the stop. Sleeve 42 on screw 43 spaces stop 39 from disc 14, stop 39 also engaging one of the brass rods 17.

In operation, the device is positioned as in Figure 2 with the trigger engaging the latch. When lowered into a tank of oil in this position, the oil, or other fluid, flows through the device bringing the device to temperature equilibrium quickly. When the device reaches the level where the temperature is desired, several raisings and lowerings at this level through a short distance, say a foot, ensure that the oil is pumped and circulated through the devise so that the thermometer bulb and all adjacent fittings and equipment on the device are brought to a temperature essentially that of the level to be tested. This also ensures that the oil within the device is an accurate sample of that at the level where the temperature is desired, so that the equilibrium temperature thus obtained will be preserved until a reading of the thermometer may be made.

A quick jerk on the cord supporting the device causes pin 37 to slide in notches 36 and release latch 28 against the bias of spring 38. The bias of springs 27 closes the device, collar 16 filling opening 26 and gasket 19 seating on surface 23. A true sample of the oil at that level is thus trapped, being sealed off from contact with oil in the tank so that it cannot be displaced during removal as with present devices. The device is then drawn out of the tank and the thermometer read. At the same time, a true sample of oil is obtained from the level where the temperature is taken and this sample maintains the thermometer at the equilibrium temperature.

Because of the closed container, weathering of the oil does not occur and the thermometer is not cooled by evaporation of oil from the sample. This is particularly desirable in gasolines, particularly casinghead gasolines. The main body of the device is preferably made of a non-heat conducting material as bakelite so that with wide differential temperatures error may not creep in. The oil or other fluid can be circulated through the device, equilibrium is quickly reached so that temperature readings can be taken rapidly and accurately.

In the claims, the word "thermometer" has been used to include any suitable temperature indicating means, particularly a thermocouple; the word "pumping" has been used to mean the fluid circulation possible by repeated raising and lowering of the device to bring the device to temperature equilibrium with the material at that level in the container where the device is positioned.

We claim:

1. An apparatus for temperature determination, including a thermometer, the apparatus comprising an open ended shell, the temperature responsive element of the thermometer extending into said shell, oppositely spaced closures for said open ended shell, said closures being movable relative to said shell, means for retaining said closures in position wherein said shell is open, said means including a trigger and latch mechanism, and means for actuating said trigger and latch mechanism and to move said closures to close said open ends to trap a body of material in a container in contact with said temperature responsive element and seal said trapped body substantially out of contact with material in said container or the atmosphere.

2. An apparatus for temperature determination, including a thermometer, the apparatus comprising an open ended shell, the temperature responsive element of the thermometer extending into said shell, oppositely spaced closures for said open ended shell, said closures being movable relative to said shell, means including a trigger and latch mechanism for retaining said closures in a position wherein said shell is open, a member for suspending said apparatus in a container, and means responsive to a jerk on said member for actuating said trigger and latch mechanism and to move said closure to close said open ends to trap a body of material from said container in contact with said temperature responsive element, and seal said trapped body substantially out of contact with material in said container or the atmosphere.

3. An apparatus for temperature determination, including a thermometer, the apparatus comprising an open ended shell, the temperature responsive element of the thermometer extending into said shell, oppositely spaced closures for said open ended shell, said closures being movable relative to said shell, means for retaining said closures in a position wherein said shell is open, a member for suspending said apparatus in a container, and means responsive to a jerk on said member for releasing said retaining means and to move said closures to close said open ends to trap a body of material from said container in contact with said temperature responsive element and seal said trapped body substantially out of contact with material in said container or the atmosphere.

4. An apparatus for temperature determination, including a thermometer having a temperature responsive element, the apparatus comprising an open ended shell, oppositely spaced closures for said shell, means for mounting said thermometer with the temperature responsive element thereof extending into said shell, means for urging said closures into a first position to close said shell, means for retaining said closures in another position wherein said shell is open, said means including a trigger and latch mechanism, and a member for raising and lowering said apparatus in a container and releasing said trigger and latch mechanism to permit said urging means to move said closures to said first position to close said shell and trap a body of material in contact with said temperature responsive element and seal said trapped body substantially out of contact with material in said container or the atmosphere.

5. An apparatus for temperature determination including a thermometer having a temperature responsive element, the apparatus comprising a vertical shell having openings adjacent the ends thereof, closures for said openings in said shell, means for mounting said thermometer with the temperature responsive element thereof extending into said shell, means urging said closures into a first position to close said shell, means for retaining said closures in another position wherein said shell is open and material can be pumped therethrough, said means including a trigger and latch mechanism, and a member for raising and lowering said apparatus in a container and releasing said trigger and latch mechanism to permit said urging means to move said closures to said first position to close said shell and trap a body of material in said shell about said temperature responsive element.

6. An apparatus for temperature determination including a thermometer having a temperature responsive element, the apparatus comprising a shell having openings at each end thereof, a closure within the shell for an opening at one end of the shell, another closure outside the shell for an opening at another end of the shell, means urging said closures into a shell closing position, a trigger and latch mechanism for retaining said closures in a shell open position, and a member for supporting said apparatus and releasing said trigger and latch mechanism whereby said shell is closed to trap a body of material about said temperature responsive element.

7. An apparatus for temperature determination including a thermometer having a temperature responsive element, the apparatus comprising a container having apertures therein adjacent the ends of said container, closure means for said apertures movable between a first position in which said apertures are open and a second position in which said closure means close said apertures and seal said container, means urging said closure means into said second position, and a trigger and latch mechanism for retaining said closure means in said first position against the urge of said urging means and releasable to permit said urging means to move said closure means to said second position from said first position.

8. An apparatus for temperature determination including a thermometer having a temperature responsive element, the apparatus comprising a container having apertures therein adjacent the ends of said container, closure means for at least one of said apertures, said means being movable between a first position in which said aperture is open and a second position in which said aperture is closed and said container can retain a liquid, means urging said closure means into said second position, and a trigger and latch mechanism for retaining said closure means in said first position against the urge of said urging means and releasable to permit said urging means to move said closure means to said second position from said first position.

9. An apparatus for temperature determination including a thermometer having a temperature responsive element, the apparatus comprising a container having a fluid inlet and an outlet, a closure for said inlet, means urging said closure into an inlet closing position, means for retaining said closure against the urge of said urging means in a position wherein said inlet is open, a member for suspending said apparatus, and means responsive to a jerk on said member for releasing said retaining means to permit said urging means to move said closure to close said inlet and trap a body of fluid in said container.

10. An apparatus for temperature determination including a thermometer having a temperature responsive element, the apparatus comprising a container having a fluid inlet and an outlet, a closure for said inlet, means urging said closure into an inlet closing position, a trigger and latch mechanism for retaining said closure in an inlet open position, and a member for supporting said apparatus and releasing said trigger and latch mechanism whereby said inlet is closed and a body of fluid is trapped in said container.

OLIVER W. JOHNSON.
PHILIP S. WILLIAMS.